United States Patent [19]

Boyer

[11] 3,919,356

[45] Nov. 11, 1975

[54] HALOGENATED NORBORNENE-METHANONAPHTHALENE DERIVATIVES AND THEIR APPLICATIONS

[75] Inventor: Nicodemus E. Boyer, Parkersburg, W. Va.

[73] Assignee: Borg-Warner Corporation, Chicago, Ill.

[22] Filed: Dec. 20, 1971

[21] Appl. No.: 210,112

Related U.S. Application Data

[63] Continuation of Ser. No. 782,444, Dec. 9, 1968, abandoned, which is a continuation-in-part of Ser. No. 658,616, Aug. 7, 1967, abandoned.

[52] U.S. Cl...... 260/891; 260/45.7 R; 260/45.75 R; 260/735
[51] Int. Cl.² .......................................... C08L 9/00
[58] Field of Search .... 260/45.7 R, 648 C, 45.75 R, 260/891, 735; 106/15 FP

[56] References Cited
UNITED STATES PATENTS

| | | | |
|---|---|---|---|
| 2,606,910 | 8/1952 | Herzfeld et al. | 260/648 |
| 2,610,920 | 9/1952 | Hopkinson | 106/15 |
| 2,802,809 | 8/1957 | Hayes | 260/880 |
| 2,900,377 | 8/1959 | Fields | 260/139 |
| 2,913,443 | 11/1959 | Edmonds, Jr. | 260/94.2 |
| 2,952,712 | 9/1960 | Roberts et al. | 260/650 |
| 3,050,567 | 8/1962 | Schmerling | 260/648 |
| 3,151,992 | 10/1964 | Blair et al. | 106/15 |
| 3,396,201 | 8/1968 | Weil et al. | 260/648 |
| 3,403,036 | 9/1968 | Hindersinn et al. | 260/45.75 |
| 3,406,136 | 10/1968 | Scarso et al. | 260/23.7 |
| 3,524,761 | 8/1970 | Humphrey | 117/138 |
| 3,649,712 | 3/1972 | Grabowski | 260/873 |

*Primary Examiner*—M. J. Welsh
*Attorney, Agent, or Firm*—Richard J. Schlott

[57] ABSTRACT

Flame retardant polymeric compositions comprising a polymeric base, a flame-retarding amount of an additive of the structure

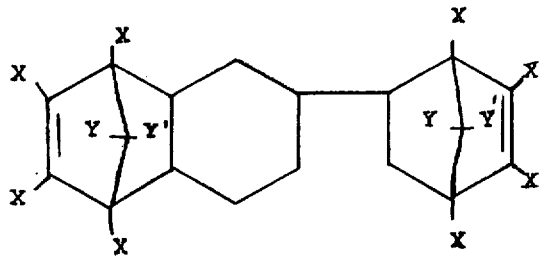

wherein X is halogen and Y and Y' are independently selected from the group consisting of hydrogen, halogen, lower alkyl and $C_1$ to $C_4$ alkoxy, and a synergistic additive selected from the group consisting of antimony oxide and zinc borate. In addition to flame-retardant characteristics, these polymeric compositions exhibit improved melt flow and thermal processability.

5 Claims, No Drawings

HALOGENATED NORBORNENE-METHANONAPHTHALENE DERIVATIVES AND THEIR APPLICATIONS

CROSS REFERENCES TO RELATED APPLICATION

This application is a continuation of application Ser. No. 782,444, filed Dec. 9, 1968, now abandoned, which was a continuation-in-part of application Ser. No. 658,616 filed Aug. 7, 1967 now abandoned.

BACKGROUND AND SUMMARY OF THE INVENTION

This invention relates generally to novel compositions of matter which may be generically identified as halogenated norbornene (norbornenyl methanonaphthalene) derivatives. Such compositions have been found to have useful properties, particularly as flame retardant additives for normally flammable plastic compositions such as materials containing thermoplastic and thermoset polymers. These flame retardant additives, when blended with the plastic compositions prior to moldings extruding, or the like, are stable at normal processing temperatures and do not discolor the plastic or have an adverse effect on the flow characteristics thereof. Consequently, the use of the subject compositions as flame retardants has solved many of the problems which have heretofore been associated with previously known flame retardants. The latter, in many instances, have been incompatible with certain polymeric compositions and have often downgraded the fabricating capabilities of plastic.

In general, the compositions to be described in more detail below have the general structural formula:

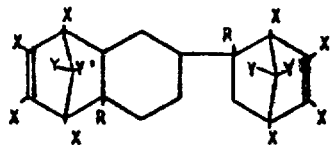

where X is halogen, preferably Cl, Br or F; Y and Y' are each selected from the group consisting of hydrogen, haloger, lower (1-4C) alkyl, lower (1-4C) alkoxy, and halogen substituted lower (1-4-C) alkyl and alkoxy radicals; and R is selected from the group consisting of hydrogen, lower (1-4C) alkyl, and halogen radicals.

In a preferred embodiment, these products are obtained by a Diels-Alder reaction in which two moles of a halogenated cyclopentadiene are reacted with one mole of a composition having the formula:

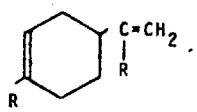

where R is selected from the group consisting of hydrogen, lower (1-4C) alkyl radicals and halogen radicals.

Examples of the latter are 4-vinylcyclohexene (a dimer of butadiene), 4-(α-chlorovinyl)-1-chlorocyclohexane (a dimer of chloropress), and d,1-limonene (dipentene, a dimer of isoprene).

With reference to the background and state of the art of compositions of this general character, reference is made herein to an article by H. E. Ungnade and E. T. McBee entitled "The Chemistry of Perchlorocyclopentenes and Cyclopentadienes"; *Chemical Reviews* 58(2), 249–320 (1958). This article covers in detail a large number of Diels-Alder adducts prepared from the reaction of halogenated cyclopentenes and cyclopentadienes with various dienophiles. There is, however, no reference in the article to any class of Diels-Alder adducts prepared with 2 moles of halogenated cyclopentadiene with the dienophile. Moreover, all of the dienophiles are either linear or contain only ring unsaturation, the importance of which will become clear from the description below.

U.S. Pat. No. 3,392,136 describes a flame retardant for polymeric compositions having the general formula:

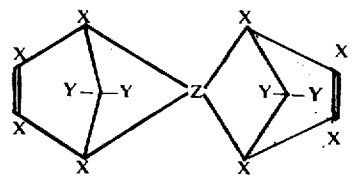

where X is bromine, chlorine, or fluorine; V is bromine, fluorine, chlorine, alkyl or alkoxy radicals; and 2 is a tetravalent cyclic hydrocarbon radical containing at least 5 carbon atoms.

In the aforementioned specification, each example of the reactant forming the Z radical is characterized by dual unsaturation confined to the ring system. In contrast, Applicant's class of dienophiles may be regarded as having a divalent cyclic part and a divalent linear part, 4-vinyl-1-cyclohexene being the most important example.

In U.S. Pat. No. 2,900,377 issured to E. K. Fields on Aug. 18, 1959, there is described an example (Example V) in which equimolar proportions of 1-vinyl cyclohexene-3 (i.e., 4-vinyl-1-cyclohexene) are reacted with hexachlorocyclopentadiene. It is clear from this example, however, that only 1:1 molar adducts were formed by this reaction. Other examples cited in the Fields' patent include d,1-limonene with hexachlorocyclopentadiene; but in this case, an excess molar proportion of d, 1-limonene was used as the reactant and accordingly, only a 1:1 adduct is formed.

The novelty and utility of this invention resides in the fact that the subject compositions are prepared by reacting 2 moles of halogenated cyclopentadiene with 1 mole of a diene (e.g., 4-vinyl-1-cyclohexene) that has partly linear unsaturation (e.g., with one vinyl group) and partly cyclic unsaturation (e.g., with one cyclohexene double bond). In this manner, a norbornene methanonaphthalene compound results with a freely rotating central single C—C bond. This novel type of compound clearly distinguishes over products formed by reacting halogenated cyclopentadiene with (1) cyclic dienes (which are discussed at length in the *Chemical Reviews* article and the U.S. Pat. No. 3,392,136 cited above.) and with (2) linear dienes (e.g., butadiene, as discussed in cited *Chemical Reviews* article).

In blending the compositions to improve the flame retardant properties of plastics, it has been found that it is only necessary to use about 1 to 30 per cent by weight of the additive and ordinarily only 5 to 25 per cent by weight. Up to 50 per cent of additive may be used. As an incidental benefit, these compositions also improve other certain physical properties, i.e., the brittleness is diminished, elasticity is improved, and color holding properties are also enhanced.

Accordingly, it is a principal object of the invention to provide novel compositions of matter having the general formula:

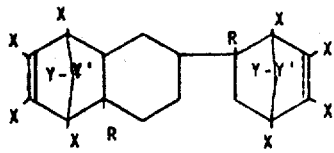

where X is halogen; Y and Y' are each selected from the group consisting of hydrogen, halogen, lower (1-4C) alkyl, lower (1-4C) alkoxy, and halogen substituted lower (1-4C) alkoxy and alkyl radicals: and R is selected from the group consisting of hydrogen, lower (1-4C) alkyl, and halogen radicals.

Another object of the invention is to provide novel methods of preparing compositions described in the previous object.

Additional objects and advantages will be apparent from reading the following detailed description.

DESCRIPTION

With reference to the general class of compounds described above, a very special case of these formulations is where bother the X and Y radicals are halogen and, more specifically, chlorine. This compound, which has the systematic name: 6-(1',4',5',6',7',7'-hexachloro-5'-norbornen -2'-yl)-1,2,3,4,9,9-hexachloro-1,4,4a,5,6,7,8,8a-octahydro-1,4-methanonaphthalene, will be referred to hereinafter as CNB. It is formed by the Diels-Alder reaction referred to above; and more specifically it is the reaction product of 2 moles of hexachlorocyclopentadiene with 1 mole of 4-vinyl-1-cyclohexene.

To further illustrate preparation of the compounds, several examples will be set forth, it being understood that the examples are for the purpose of illustration and are not to be limited to the specific recipes and conditions.

EXAMPLE I

The preferred composition, CNB, a white crystalline solid (MP 238°–243°C.) was prepared by reacting 4-vinyl-1-cyclohexene with 2 moles of hexachlorocyclopentadiene added gradually to the preheated 4-vinyl-1-cyclohexene. This slow addition of the $C_5Cl_6$ avoids a high temperature exothermic reaction and greatly increases the yield of CNB obtained to about 82 per cent at temperatures ranging up to 180°C.

Four moles (432.8 g.) of 4-vinyl-1-cyclohexene were preheated in a three-necked, 2-liter flask provided with a nitrogen gas inlet tube, a thermometer, stirrer, and a reflux condenser topped by a Drierite tube. In addition to the above, two grams of 2,6-di-tert-butyl-4-methylphenol was added as an antioxidant. The $C_8H_{12}$ was preheated to a refluxing temperature (about 128°–130°C./760 mm) and 8 moles (2182.4 g.) of $C_5Cl_6$ were added dropwise or in a thin stream over a period of 6 hours, gradually increasing the temperature to about 148°C., and later to about 160°C. after all of the $C_5Cl_6$ had been added. The temperature was maintained at about 160°C. for an additional 7 hours. The mixture was then cooled to about 100°–140° C. by the addition of an equal volume of isopropyl alcohol initially at room temperature. The CNB in a yield of 68.4 percent precipitated as substantially white crystals and was collected by filtration and dried. Recrystallization from n-heptane is useful in order to get analytically pure crystals with a relatively sharp melting point between 238°–241°C.

EXAMPLE II

Using the same laboratory set-up as Example I, the following reactants were mixed at room temperature: 8 moles (2182.4 g.) of hexachlorocyclopentadiene ($C_5Cl_6$, a pale yellow liquid, boiling point 229°C./760 mm.); and 4 moles (432.8 g.) of 4-vinyl-1-cyclohexene ($C_8H_{12}$, colorless liquid, boiling point 126°–127°C./760 mm.). In addition to the above, the following additives were mixed with the primary reactants: 1 g. hydroquinone as an antioxidant; and 3 g. dibutyltin dimaleate[1] as a scavenger for traces of hydrogen chloride formed during the reaction. While slowly introducing a stream of nitrogen into the mixture, with stirring, the reactants were heated by an external heating mantle over the flask. As the temperature increased, an orange-colored, clear solution was formed and in approximately 6 hours, the temperature reached 160°C. At this point a quick exothermic reaction was initiated with the evolution of hot vapor and the internal temperature rapidly rose to 245°C. External heating was discontinued throughout this exothermic reaction and external cooling applied.

[1]Thermolite 13, M & T Chemical Company

When the mixture reached 245°C., it darkened quite noticeably. Upon cooling the mixture to 90°C., the mixture became viscous, but was still stirrable; and at 25°C. (room temperature), the entire mixture solidified in the vessel.

The crude product was dissolved in acetone and purified by filtering through charcoal. After concentration of the filtrate, the product, in the form of white crystals, was recovered in a 60 percent yield. Additional small amounts were recovered in the filtrate; and the final filtrate contained a dark brown, viscous tar as the residue.

The crystals were further purified by recrystallization from acetone. The results of an analysis showed a relatively pure product identified as CNB, melting point 238°–243° C.; and the observed results were confirmed by infrared absorption techniques. Breakdown of the constituents showed the following composition: $C_{16}H_{12}Cl_{12}$: Cl-65.07%; C-33.08%; H-1.85%; mol. wt., 653.8.

It will be noted that the primary difference between Examples I and II is in the slow addition of $C_5Cl_6$ in Example I. The rapid exothermic reaction which takes place when the primary reactants are mixed at room temperature, and then heated, increases the risk of a violent, uncontrolled reaction taking place. Moreover, somewhat lower yields (45–60 percent as compared to 70–82 percent) are obtained by the method set forth in Example II. Nevertheless, the technique of Example II can be useful for limited scale experiments.

EXAMPLE III

Exactly the same reaction set up as Example III was used in this example, but additional amounts of an antioxidant were present in the form of 2 g. of 2,6-di-tert-butyl-4-methylphenol. Also, instead of the acetone, a mixture of methanol and petroleum ether was used to dilute the solidified product before purification. A yield of 1160.8 g. or 55.3 percent of the theoretical yield was obtained. Combining the washings from the filtration procedures yielded an additional 26.6 percent of the starting material to provide the total yield of 81.9 percent.

Additional runs following the procedure of Example II were made using other solvents such as chlorobenzene, acetylene tetrachloride, xylene, ethylene glycol, propylene glycol, 1,3-butanediol, diethylene glycol, dipropylene glycol and/or excess $C_5Cl_6$. The use of different solvents resulted in different reaction times and temperatures before the exothermic reaction began. It has also been noted that small amounts of Lewis acid as iron (III) chloride, aluminum (III) chloride, or boron trifluoride increased the reaction rate and thus resulted in shorter periods of heating and temperatures.

Recrystallization products from the acetone, ethanol, diethyl ether, n-heptane, and/or petroleum ether were dried; and the purified products were all identified as CNB by taking mixed melting points which showed no melting point depression in the various runs. When pure, the crystals consistently melted at 241°–243°C.

EXAMPLE IV

Ten moles or 1362.3 g. of dipentene or d,1-limonene ($C_{10}H_{16}$), a colorless liquid, boiling point 178°–180°C./760 mm., mol. wt. 136.23, were mixed at room temperature with 16 moles (4365 g.) of hexachlorocyclopentadiene. Five grams of 2,6-di-tert-butyl-4-methylphenol (antioxidant) and 7 g. of dibutyltin dimaleate (scavenger) were added to this mixture.

Upon heating to 60°C., the solid additives dissolved to form a clear, pale orange mixture; and at 145°C., it developed a deep, red color. Heating was continued for about fifteen hours under a nitrogen atmosphere with continuous stirring. The 2:1 adduct, later identified as $C_{20}H_{16}C_{12}$, was precipitated out by diluting the mixture with petroleum ether and isopropyl alcohol. Solidification of the product by conventional techniques resulted in a product formation of white crystals with a melting point of over 210°C. Because of the presence of stereoisomers in the C-Cl₂ bridge, a sharp melting point could not be obtained. The product was identified as 6-(1', 4',5',6',7',7'-hexachloro-2'-methyl-5'-norbornen-2'-yl)-1,4, 4a,5,6,7,8,8a-octahydro-1,2,3,4,9,9-hexachloro-8a-methyl-1,4-methanonaphthalene, a compound having the following structure:

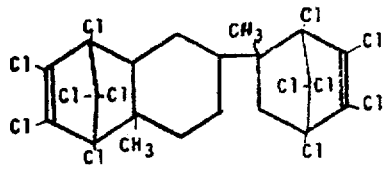

EXAMPLE V

The following equation represents the synthesis of another Diels-Alder adduct, 6-(1',4',5',6'-tetrachloro-7',7'-dimethoxy-5'-norbornen-2'-yl)-1,2,3,4-tetrachloro-9,9-dimethoxy-1,4,4a,5,6,7,8,8a-octahydro-1,4-methanonaphthalene, $C_{22}H_{24}Cl_8O_4$, or tetramethoxy chlorinated norbornene derivative (hereinafter TCNB):

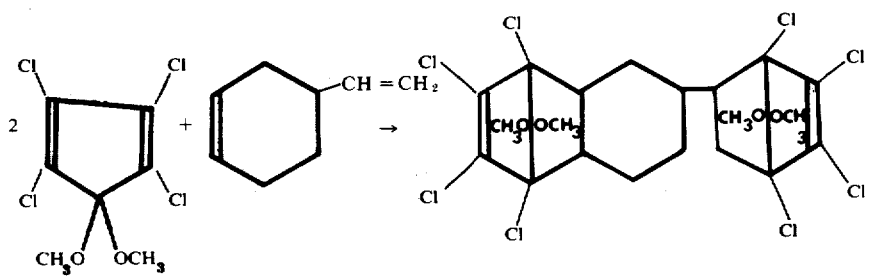

In this example, 1,1-dimethoxy-2,3,4,5-tetrachlorocyclopentadiene or $C_5Cl_4(OCH_3)_2$, a pale yellow, clear liquid (b.p. 108–110° C./11 mm; 102–105°C./5mm. index of refraction, $n_D^{20} = 1.5288$; calculated molecular weight, 263.94), 0.5 mole or 132 grams, was added dropwise, with mechanical stirring, in nitrogen atmosphere, to 0.25 mole or 27.05 mole or 27.05 grams of 4-vinyl-1-cyclohexene or $C_8H_{12}$ (a colorless liquid, b.p. 130 °C./760 mm), which had been preheated to 110°C. The addition was completed in 46 minutes, and during this time, gentle heating by an external electric heating mantle was continued in order to keep the reaction temperature in the range of 103 to 144°C. After completed addition, the golden yellow reaction mixture was heated for two hours at 110–142°C.; and then for 9 hours at 142–152°C.

By dilution of the viscous, crude product at room temperature with about equal volumes of isopropyl alcohol and acetone, a white solid was obtained and was isolated by filtration. After one recrystallization from acetone, the melting point of the white crystals was 209–210°C. without decomposition. The compound TCNB (see above) or $C_{22}H_{24}Cl_8O_4$ was found to be suitable at this stage of purification for applications as a fire retardant additive to various resins. For obtaining analytical purity, however, this sample was recrystallized from anhydrous diethyl ether to obtain snow-white crystals, m.p. 224°C. (to a colorless liquid, without decomposition), which was correctly identified as the expected product $C_{22}H_{24}Cl_8O_4$ (see structural formula above) by microanalyses of the elements, and by the determination of its molecular weight and infrared spectrum. The yield of this product was 79.3 percent or 126.1 g. after one crystallization, and upon recrystallization, the recovery was 92.8 percent.

EXAMPLE VI

A brominated norbornene derivative, 6-(1',4',5',6', 7',7'-hexabromo-5'-norbornen-2'-yl)-1,2,3,4,9,9-hexabromo-1,4, 4a,5,6,7,8,8a-octahydro-1,4-methanonaphthalene (hereinafter BNB) may be prepared by the following reaction.

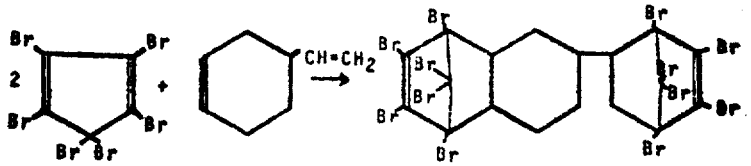

Hexabromocyclopentadiene or $C_5Br_6$ (a yellow, crystalline solid, m.p. 83°–85°C.), 0.1 mole or 53.95 g., was mixed at room temperature with 0.05 mole or 5.4 g. of 4-vinyl-1-cyclohexene (a colorless liquid, b.p. 130°C./760mm.). Upon heating to 50°C., a yellow, homogeneous solution was formed. It was heated for 3 hours at 100°–130°C. and for 4.5 hours at 130°–135°C. The brown product was treated with boiling acetone and then with boiling tetrachloroethylene. The dark brown solid which was insoluble in these solvents was dried at a reduced pressure overnight over phosphorus (V) oxide. The product was a crystalline powder, black-brown after drying, m.p. over 420°C. Its composition of $C_{18}H_{12}Br_{12}$ or "BNB" (see structure above) was demonstrated by analysis.

EXAMPLE VII

Set forth hereinbelow is another compound of this invention, namely 6-(1',4',5',6'-tetrachloro-7',7'-difluoro-5'-horbornen-2'-yl)-1,2,3,4 -tetrachloro-9,9-difloro-1,4,4a,5,6, 7,8,8a-octahydro-1,4-methanonaphthalene, $C_{18}H_{12}Cl_8F_4$ (hereinafter FCNB). The compound is synthesized as shown in the following equation:

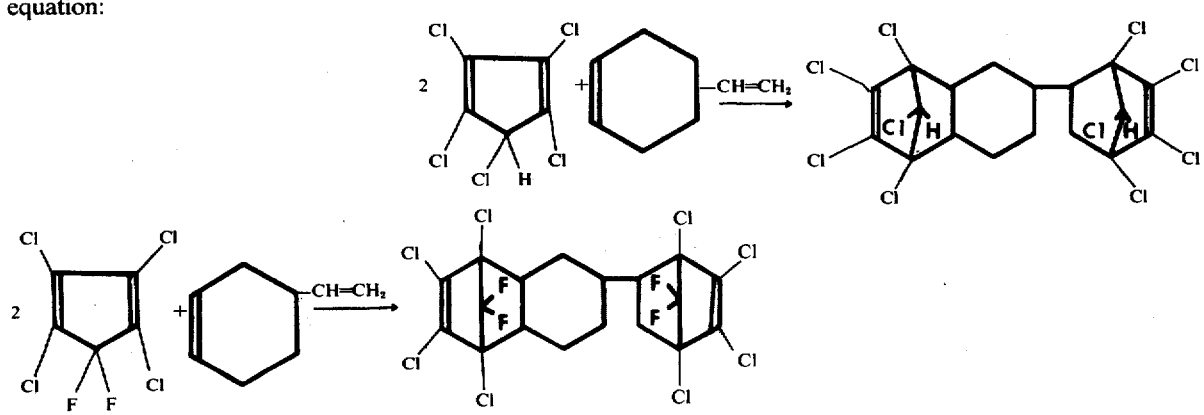

0.168 mole or 40.3 grams of 1,1-difluoro-2,3,4,5-tetrachlorocyclopentadiene or $C_5Cl_4F_2$, a pale yellow, clear liquid (b.p. 40°–50°C/4 mm; calculated molecular weight, 239.87), was mixed at room temperature with 0.084 mole or 9.1 grams of 4-vinyl-1-cyclohexene or $C_8H_{12}$ (a colorless liquid, b.p. 128°–130°C/760 mm) and with 0.1 gram of 2,6-di-tert.-butyl-4-methylphenol (white crystals, m.p. 67°–69°C). The mixture was heated in a nitrogen atmosphere, with mechanical stirring, to 140°–163°C for 5 hours and to 165°C for 6 hours. The liquid by-products of the reaction were removed by distillation at a reduced pressure. The residue of the distillation solidified to a clear, glassy, dark brown solid which was purified by recrystallization first from acetone and then from ether, filtering in the presence of active charcoal for decolorization of the solutions. The purified solid product formed white crystals, m.p. 196°–200°C and was identified as FCNB or $C_{18}H_{12}Cl_8F_4$ by analyses (found, 38.0% C, 2.0% H, 46.6% Cl, and 13.3% F, which confirmed the calculated values) and by a determination of the molecular weight (calculated, 568; found, 576).

This product FCNB, 20 parts by weight, was mixed with 8 parts of zinc borate ($Zn_3B_4O_9$), 1 part of Pluronic F-38 (a mold release), and 61 parts of acrylonitrile-butadienestyrene graft copolymer. The mixture was milled at 325°F for 7 minutes, and injection-molded at 410°F. A self-extinguishing, pale cream-colored plastic of excellent physical properties was obtained. A similar composition was made with the same amount of antimony (III) oxide replacing the zince borate.

EXAMPLE VIII

Set forth hereinbelow is the synthesis of another product of this invention, namely 6-(1',4',5',6',7'-pentachloro5'-norbornen-2'-yl)-1,2,3,4,9-pentachloro-1,4,4a,5,6,7,8,8a-octahydro-1,4-methanonaphthalene, $C_{18}H_{14}Cl_{10}$, briefly designated as PHNB. The following equation represents the synthesis:

0.168 mole or 40.0 grams of 1,2,3,4,5-pentachlorocyclopentadiene ($C_5Cl_5H$), a pale yellow, clear liquid (b.p. 84°/3.4mm to 90°C/3.6mm; calculated molecular weight, 238.33), was mixed at room temperature with 0.084 mole or 9.1 grams of 4-vinyl-1-cyclohexene ($C_8H_{12}$)and with 0.15 gram of 2,6-ditert.-butyl-4-methylphenol. The mixture was heated in a nitrogen atmosphere, with magnetic stirring, at a gradually increasing temperature, for 11.5 hours at 130° to 180°C. Volatile by-products were removed by distillation from the crude reaction product at up to 156°C/0.32mm pressure. The residue of the distillation after cooling was a dark brown solid. The compound was purified by repeated crystallization first from the chloroform and then from isopropyl alcohol and acetone, using active charcoal for decolorization of the solutions. The final crystallization yielded a white solid, m.p. 62°–75°C, which after drying in a vacuum oven at room temperature was identified as PHNB or $C_{18}H_{14}Cl_{10}$ by analyses of carbon, hydrogen, and chlorine, and by a molecular weight determination, as follows:

Anal. Calcd. for PHNB ($C_{18}H_{14}Cl_{10}$): C, 36.97% H, 2.41%, Cl, 60.62%; molecular weight, 585. Found: C, 36.84%, H, 2.44%; Cl, 60.71%; molecular weight, 595 (determined in chloroform solution).

The melting point range is explained by the presence of several geometrical isomers in the endo- or exo- positions of the two —CHCl— groups in the norbornene and in the methanonaphthalene rings, as well as due to the asymmetric carbon atoms present in the structure of PHNB.

The infrared spectrum showed absorption bands characteristic of the functional groups of PHNB.

The utility of PHNB as a fire retardant additive in ABS resins was demonstrated by experiments similar to those described in the preceding example of this invention for FCNB.

EXAMPLE IX

The synthesis of 6-(1',4',5',6'-tetrachloro-5'-norbornen-2'-yl)-1,2,3,4-tetrachloro-1,4,4a,5,6,7,8,8a-octahydro-1,4-methanonaphthalene, ($C_{18}H_{16}Cl_8$) briefly designated as THNB is shown in the equation:

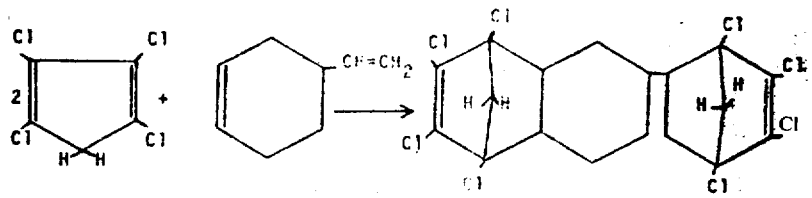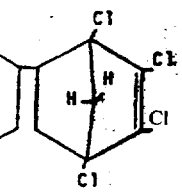

0.172 mole or 35.0 g. of 2,3,4,5-tetrachlorocyclopentadiene or $C_5Cl_4H_2$, white crystals (m.p. 59°–62°C; calculated molecular weight, 203.88), was mixed at room temperature with 0.086 mole or 9.3 grams of 4-vinyl-1-cyclohexene or $C_8H_{12}$ and 0.13 gram of 2,6-di-tert.-butyl-4-methylphenol. The mixture was heated with stirring in nitrogen atmosphere, at a gradually increasing temperature, for 11.5 hours at 130° to 180°C. Volatile by-products were distilled from the crude reaction product at up to 121°C of vapor temperature and at 0.1 mm Hg pressure. The dark brown, solid residue was recrystallized from n-heptane, chloroform, and isopropyl alcohol to obtain an off-white solid which was identified by analyses as THNB or $C_{18}H_{16}Cl_8$. This product was found to have fire retardant properties in resins by experiments similar to those described in the preceding two examples.

EXAMPLE X

Synthesis of another product of this invention, 6-(1', 4', 5', 6'-tetrachloro-7',7'-diethoxy-5'-norbornen-2'-yl)-1,2,3,4-tetrachloro-9,9-diethoxy-1,4,4a,5,6,7,8,8a-octahydro-1,4-methanonaphthalene, $C_{26}H_{32}O_4Cl_8$, briefly designated DENB.

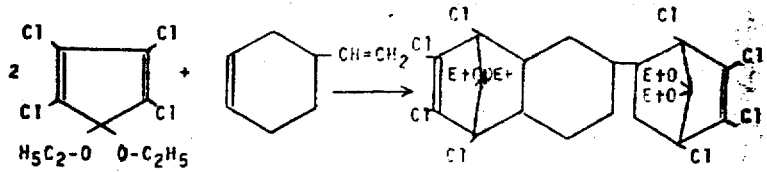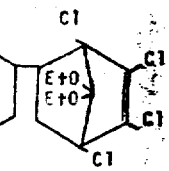

0.086 mole or 25.1 grams of 1,1-diethoxy-2,3,4,5-tetrachlorocyclopenta-2,4-diene or $C_9H_{10}O_2Cl_4$, a golden yellow, clear liquid (b.p. 77°–78°C/0.93 mm; calculated molecular weight, 291.99) was mixed at 25°C with 0.043 mole or 4.65 grams of 4-vinyl-1-cyclohexene or $C_8H_{12}$ and with 0.09 gram of 2,6-di-tert.-butyl-4-methylphenol. This mixture was heated in a nitrogen atmosphere, with stirring and initially a slow reflux, at 130° to 160°C for 13 hours. A small amount (2.5 grams) of unreacted raw materials and of volatile by-products were removed by distillation at up to 70°C of vapor temperature and 0.09 mm Hg. pressure. The residue of this distillation, when cooled to room temperature, was a dark brown solid. It was recrystallized from chloroform and from ethanol, using powdered carbon black for discoloration. After three crystallizations, a white crystalline solid was obtained as the principal product of the reaction, which melted in the range of 60°–70°C. This product was identified as $C_{26}H_{32}O_4Cl_8$ or DENB by elementary analyses and by determinations of the molecular weight, the infrared spectrum, and the nucleomagnetic resonance (NMR) spectrum. The melting point range is explained by the presence of several geometrical isomers in the endo- or exo- positions of the —C(O—$C_2H_5$)$_2$-bridges in the methanonaphthalene and in the norbornene rings, and due to the asymmetric carbon atoms in the structure of DENB shown above.

The utility of DENB as a fire retardant and a plasticizer of resins was demonstrated as follows. A mixture was prepared from 7 parts by weight of DENB, 50 parts of polyvinylchloride, 20 parts of the Marbon acrylonitrile-butadiene-styrene graft polymer resin, 2 parts of the plasticizer, 2 parts of the stabilizer, 0.5 parts of antioxidant, 0.5 parts of the lubricant and 0.5 parts of the synergistic fire retardant, antimony (111) oxide. This mixture was milled at 320°F for 4 minutes and compression-molded at 340°F and 50,000 psi for 2 minutes. The resulting plastic sheet was pale yellowish-white and had the outstanding flexibility and other required physical properties characteristic of the ABS resins. This plastic passed the Underwriters' Laboratories' vertical test of flammability No. 94, and was found to be self-extinguishing, Group 1 (the best classification, no drip in contact with the flame). A control composition was made from the same materials and by the same procedure, except that no DENB was used. The control sample had a lower tear strength and failed to pass the U.L. test.

EXAMPLE XI

The chemical intermediate for this example was 1,1-dibutoxy-2,3,4,5-tetra-chlorocyclopenta-2,4-diene or $C_{13}H_{18}O_2Cl_4$, a golden yellow, clear liquid. it was prepared as follows. One gramatom or 23 grams of metallic sodium was added in small pieces to 800 ml. of n-butyl alcohol. A solution of sodium n-butoxide in butanol was formed in an exothermic reaction. This solution was added dropwise over a 4 hour period with stirring, to a solution of 0.5 mole or 136.5 g. of hexachlorocyclopentadiene ($C_5Cl_6$) in 600 ml. of n-butyl alcohol. The addition was started at 25°C; there was an exothermic reaction, and the temperature increased to 30°C. The solution was cooled externally and kept at a temperature of 25°C. The mixture was allowed to stand overnight at room temperature. Sodium chloride, which had been formed in the reaction, was removed by filtration and discarded. The filtrate was diluted with an equal volume of water, mixed, and allowed to stand in a separatory funnel, whereupon two layers were formed. The aqueous layer was discarded, but the organic layer was concentrated by distilling excess butanol at a reduced pressure. The residue of this distillation was dissolved in ether, dried over anhydrous sodium sulfate, filtered to remove solium sulfate, and the filtrate was concentrated by distilling off ether. The residue was distilled fractionally at a reduced pressure. A small fraction of recovered $C_5Cl_6$ was obtained; b.p. 75°-85°C/1mm. The desired intermediate distilled at 124°-142°C/1 mm. It was purified by another distillation at 132°-135°C/1 mm and identified as 1,1-di-n-butoxy-2,3,4,5-tetrachlorocyclopenta-2,4-diene by elementary analyses, the infrared spectrum, and a determination of the molecular weight. This intermediate was reacted with 4-vinyl-1-cyclohexene to form another product of this invention, 6-(1', 4',5',6'-tetrachloro-7',7'-di-n-butoxy-5'-norbornen-2'-yl)-1,2,3,4-tetrachloro-9,9-di-n-butoxy-1,4,4a,5,6,7,8,8a-octahydro-1,4-methanonaphthalene, $C_{34}H_{48}O_4Cl_8$, briefly designated as DBN. The synthesis of DBN is shown by the following equation, wherein Bu is n-butyl group:

duced pressure. The residue was purified by recrystallization in a similar manner as described in the preceding example. An oily, low-melting solid was obtained which was identified as the expected product DBN or $C_{34}H_{48}O_4Cl_8$ by analyses and by the characteristic absorption bands of its infrared spectrum.

The utility of DBN as a fire retardant and a plasticizer in resins was demonstrated by a similar experiment as described for its homolog DENB in the preceding example. The Cycovin type composition containing DBN passed the vertical U.L. test and was found to be self-extinguishing, Group 1.

EXAMPLE XII

Tris-(2-chloroethyl) phosphite, a colorless liquid, ($ClCH_2CH_2O—)_3P$, b.p. 132°–135°C./10 mm., 1 mole or 269.5 g., was added dropwise to a solution of 1 mole or 272.8 g. of hexachlorocyclopentadiene ($C_5Cl_6$, a pale yellow liquid) in 1 liter (860 g.) of xylene preheated to 55°C. After completed addition, the golden yellow reaction mixture was heated to 70°C., whereupon an exothermic reaction started, and the temperature reached 105°C., despite some external cooling. The mixture was cooled to 58°C. and again heated to 70°C. (total, 6.5 hours), regulating the temperature by a heating bath. Upon two fractional distillations at a reduced pressure, the reaction mixture gave as the principal product a pale yellow liquid, b.p. 96°–102°C./0.38 mm. This product was identified as 1-(B-chloroethyl)-1,2,3,4,5-pentachlorocyclopentadiene or $C_7H_4Cl_6$ by analyses, and by its I.R. spectrum.

This compound $C_7H_4Cl_6$ was used for a synthesis of a product which is part of this invention as follows:

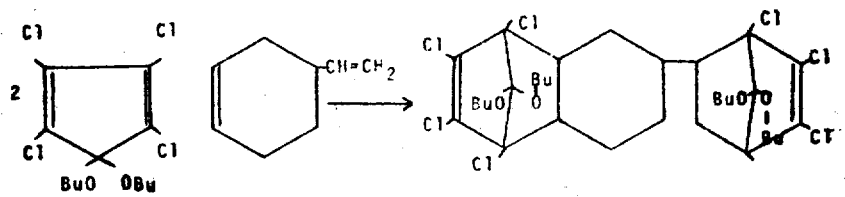

0.129 mole or 45.0 grams of 1,1di-n-butoxy-2,3,4,5-tetrachlorocyclopenta-2,4-diene or $C_{13}H_{18}O_2Cl_4$, was mixed at 25°C with 0.0645 mole or 6.98 grams of 4-vinyl-1-cyclohexene and 0.16 gram of 2,6-di-tert.-butyl-4-methylphenol. The mixture was heated with stirring in a nitrogen atmosphere, with a gradual increase of the temperature, at 130°–160°C for 13 hours. A small amount of unreacted starting materials and of volatile by-products was removed by distillation at a re-

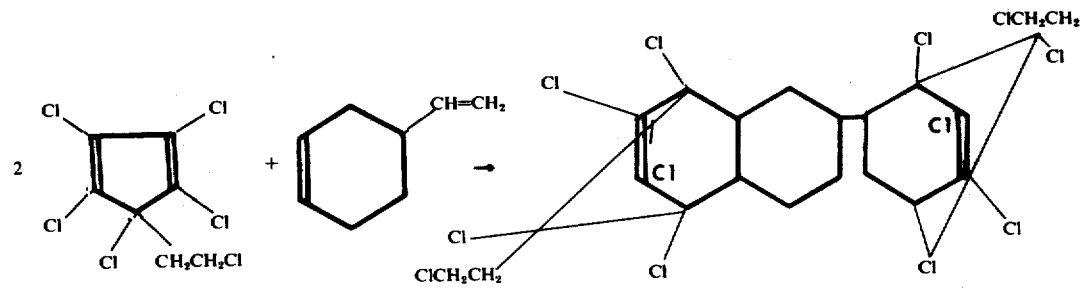

This compound, 6-(1',4',5',6',7'-pentachloro-7'-β-chloroethyl-5'-norbornen-2'-yl)-1,2,3,4,9-pentachloro-9-β-chloroethyl-1,4,4a,5,6,7,8,8a-octahydro-1,4-methanonaphthalene (hereinafter referred to as BCN) was prepared as follows:

One-half mole or 158.4 g. of $C_7H_4Cl_6$ or 1-(β-chloroethyl)-1,2,3,4,5-pentachlorocyclopentadiene (a yellow liquid, see b.p. and analysis above) was mixed at room temperature with 0.25 mole or 27.05 g. of 4-vinyl-1- cyclohexene. The mixture was heated, with stirring, in nitrogen atmosphere, for the first 3 hours at 125°–138° C. and then for 20 hours at up to 162° C. The liquid products were removed by fractional distillation at a reduced pressure, and the undistillable, brown residue was recrystallized first from acetone and then from diethyl ether and precipitated in aqueous isopropyl alcohol to obtain a nearly white, crystalline powder, which was dried at a reduced pressure over anhydrous $CaSO_4$ until constant weight at room temperature. This product, melting point 76°–78° C., was identified in a similar manner as the products described in the preceding examples by I.R. spectrum and by elementary analyses. The composition $C_{22}H_{20}Cl_{12}$ was confirmed.

EXAMPLE XIII

Chloroprene dimer, 4-(β-chlorovinyl)-1-chloro-1-cyclohexene (hereinafter referred to as CD), was prepared in the manner of Klebamkif et al., Vysokomlekul.Soedin, 4, 1145–50 (1962). [See also Chem. Abstracts 59, 1819a (1963)]. A 177.0 g. portion of the CD so prepared was charged to a reaction vessel and heated under nitrogen to 70°C. Over a period of four hours, 545.0 g. of hexachlorocyclopentadiene was added to the reaction vessel with stirring as the temperature was gradually raised to 160°C. After complete addition of reactants stirring continued for eighteen hours and the temperature was maintained at 160°–190°C. The reaction mixture was vacuum distilled, removing unreacted $C_5Cl_6$ and 1:1 adduct. The 2:1 adduct product, 6-(1',2',4',5',6',7',7'-heptachloro-5'-norbornen-2'-yl)-1,2,3,4,8a,9,9-heptachloro-1,4,4a,5,6,7,8,8a-octahydro-1,4-methanonaphthalene, $C_{18}H_{10}Cl_{14}$ (CDNB), was recovered in 25 percent yield from the distillation residue by recrystallization. The reaction is described by the structures below:

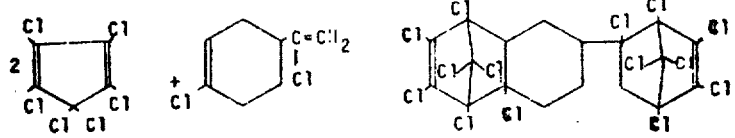

A compound of the same empirical formula $C_{18}H_{10}Cl_{14}$ was obtained by chlorination of the product of Example I (CNB) in carbon tetrachloride solution at about 60°C in the presence of UV light.

The CNB in Examples I through III was prepared by premixing hexachlorocyclopentadiene and 4-vinyl-1-cyclohexene as well as by the addition of $C_5Cl_6$ to preheated 4-vinyl-1-cyclohexene. Examples xiv and xv set forth hereinbelow illustrate that CNB may be prepared by the gradual addition of 4-vinyl-1-cyclohexene to preheated $C_5Cl_6$, i.e., it can be prepared by the reverse addition of reactants.

EXAMPLE XIV·

Utilizing the same apparatus as set forth in the previous examples, 1009.4 parts by weight of pure hexachlorocyclopentadiene ($C_5Cl_6$) was poured into a reactor. 2.4 parts by weight of 2,3-di-tert-butyl-4-methylphenol was added as an antioxidant. The mixture was stirred and heated to 180°C in a nitrogen atmosphere. 200.1 parts of 4-vinyl-1-cyclohexene was added dropwise and/or as a thin stream of solution to the reactor. The addition of the first half of the $C_8H_{12}$ was completed in 35 minutes at 178°–185° C. The heating was continued for an additional 22 minutes at the same temperature. The second half of the 4-vinyl-1-cyclohexene was added over a period of 40 minutes with continuous heating and stirring under a nitrogen atmosphere. The heating and stirring was continued for an additional 9 hours and 23 minutes at an average temperature of 183° C. The total time of addition and heating was 11 hours.

The mixture was cooled to 138° C. and precipitated by pouring into 900 parts by weight of technical grade isopropyl alcohol. The principal product was CNB which was precipitated in the form of off-white crystals. The mixture was cooled to room temperature and CNB was collected by filtration. After drying over calcium sulfate at a reduced pressure in a vacuum oven, the yield of CNB was 991.2 parts by weight or 82 percent.

Upon distillation of isopropyl alcohol from the filtrate of precipitation of CNB, a brown, clear, residual oil was obtained. This oil was demonstrated by analysis to contain lower-melting isomers of CNB designated as isomeric norbornenes (INB) of the same composition $C_{18}H_{12}Cl_{12}$. The brown, viscous oil (216.4 parts by weight or 17.9 percent yield) was found to be a fire-retardant additive and to improve flow properties, mold releasing properties, and to reduce brittleness of resins such as ABS resins.

It will be noted from this example that the yield of CNB may be improved to 82 percent by the reverse addition procedure, i.e., addition of a 4-vinyl-1-cyclohexene to preheated $C_5Cl_6$.

EXAMPLE XV

In Example XIV, CNB was synthesized using a 2:1 molar ratio of $C_5Cl_6$ to 4-vinyl-1-cyclohexene. In this example, a higher yield of CNB was obtained by employing an excess of $C_5Cl_6$ in the reaction mixture throughout the reaction. The molar ratio of $C_5Cl_6$ to 4-vinyl-1-cyclohexene was 3:1 or 50 percent excess over the calculated amount of $C_5Cl_6$ capable of reacting with the 4-vinyl-1-cyclohexene.

The reaction proceeded as follows. 900.3 parts by weight technical grade hexachlorocyclopentadiene ($C_5Cl_6$) was placed in a reaction vessel. 2.04 parts by weight of 2,6-di-tert-butyl-4-methylphenol was added as an antioxidant and an inhibitor for free radical polymerization. The mixture was heated to 160° C. under a nitrogen atmosphere and a yellowish orange solution was formed. 119.0 parts by weight of pure 4-vinyl-1-cyclohexene was added to the solution over a period of 2½ hours at 160° C. The temperature was retained in the mixture with stirring over a period of 12 hours.

273.8 parts by weight of $C_5Cl_6$ was removed from the liquid reaction mixture by distillation. The excess of $C_5cl_6$ in the experiment was 300.1 parts by weight and the percent recovery of $C_5Cl_6$ was 91.2 percent. (This was calculated on the basis of a 2:1 molar ratio required to form CNB). The residue of this distillation, while still hot (at 120° C.), was poured into 864 parts by weight of isopropyl alcohol. A white precipitate of CNB ($C_{18}H_{12}Cl_{12}$) was formed, which after filtration and complete drying, weighed 607.8 parts corresponding to 84.5 percent yield (calculated on the amount of 4-vinyl-1-cyclohexene used in the reaction). As in Example XIV, lowermelting isomers of CNB (the oil designated as INB) was obtained as the residue in 13.7 percent yield (139.7 parts) by distilling isopropyl alcohol from the filtrate.

HALOGENATED NORBORNENE DERIVATIVES AS FLAME RETARDANT ADDITIVES

The flame retardant properties of halogenated norbornene derivatives have been evaluated for a large number of different polymeric resins. In the examples which follow, the flammability of a particular sample was determined in three ways:

1. By testing in accordance with ASTM D635-63 (all quantitative burning rate measurements were made by this method);
2. By Match Test in which a specimen as described in ASTM D635-63 is held vertically and a match flame is held at its free end. The degrees of flammability may be defined as follows:
   a. Non-flammable (NF) — upon removal of the source of flame, no flame remained.
   b. Self-extinguishing (SE) — Upon removal of the source of flame (Match Test and/or gas flame test), the flame extinguished spontaneously, i.e., less than 1 second, or within the slated number of seconds less than 30.
   c. Flame-retardant (FR) — the sample burned at less than twice the burning rate of the standard material (as measured in inches per minute by the formula of ASTM D635-63).
3. Burning Tests for Plastics — Underwriters' Laboratories Subject 94 (U.L. Test). All tests qualified as "Self-Extinguishing, Group 1" in that they did not drip any flaming materials or droplets during burning test.

EXAMPLE XVI

A self-extinguishing ABS composition was made up according to Table I below:

TABLE I

| Ingredients | Function | Parts by Wt. |
|---|---|---|
| ABS Resin* | | 74.8 |
| CNB ($C_{18}H_{12}Cl_{12}$) | Novel Fire-Retardant Additive of this invention | 15.3 |
| Antimony (III) Oxide | Additive for Synergistic Action of Fire Retardance | 7.2 |
| Thermolite 25 | A scavenger for traces of acid; a stabilizer | 0.9 |
| Pluronic F38 | A mold-release agent | 0.45 |
| Mekon White | A whitener of plastics | 1.35 |
| | | 100.00 |

*ABS resin is acrylonitrile-butadiene-styrene graft copolymer.

The ingredients in Table I were mixed at room temperature in a powdery form, were milled at 320°F. for about 7 minutes to produce a homogeneous, nearly white (slightly creamywhite—the usual color of ABS resins) sheet of plastic, hard when cooled to room temperature. This milled product was molded at about 420°–470° F. by the injection-molding process known in the art, to produce plaques and bars of the molded, self-extinguishing resin which had the same white color and was completely stable thermally at these temperatures, showing no streaking and no discoloration.

This composition, after milling and injection-molding, was white, smooth, dry, and odorless, and there was no odor and no sublimate developed during the milling and molding processes. Another sample was also successfully compression-molded, with similar results.

The product retained the high tensile strength, hardness, and heat distortion temperature as ABS resins. It had also a high flexural strength and was not brittle. The flow of the resin was improved significantly by the presence of CNB, in contrast to other flame retardants known in the art which retard the flow of hot plastics so that full bars and plaques cannot be produced in the above given temperature range for milling and molding whereas in a higher temperature range a decomposition sets in. Because of its high thermal stability, lack of decomposition, and improved flow, as well as the effective flame retardance, CNB showed surprisingly excellent results and outclassed in its performance in plastics the other additives known in the art.

One of the most remarkable physical effects of CNB in ABS resins was the very high impact strength achieved by the molded plastics of the composition given in the above Table I. By repeated tests on various samples, the notched Izod impact strength of this composition of plastics was in the range of 6.8 to 7.4 ft. lb./in., whereas a plastic composition where CNB had been replaced by a similar amount of a known additive (e.g., by $C_{13}H_8O_3Cl_6$ which is the equimolar Diels-Alder adduct of maleic anhydride, 1,3-butadiene, and hexachlorocyclopentadiene) had the notched Izod impact strength of only 2.2 to 2.6 ft.lb./in., i.e., it was only about one-third that of the CNB-containing composition.

This observation immediately shows the great practical importance of this invention, e.g., of CNB as a fire retardant additive of ABS resins having such properties that it is very useful for producing novel compositions of plastics with excellent physical properties. For many applications, a high impact strength of plastics is a critical requirement.

The high degree of fire retardance of the plastics having the composition shown above in Table I was demonstrated by the vertical Underwriters' Laboratories' non-flammability test (henceforth abbreviated to U.L. Test) which was applied to a bar of this composition 60 mil (i.e., one-sixteenth inch) in thickness according to the specifications given in the description of the test given by the Underwriters' Laboratories.

The plastics of the composition given in Table I, with only 15.3 parts by weight of CNB or $C_{18}H_{12}Cl_{12}$, passed the U.L. vertical test, which is one of the most severe tests, for nonflammability of plastics. The novel composition of ABS resins containing CNB was classified as belonging to group 1, Self-extinguishing; group 1 is the best plastic, i.e., it is self-extinguishing, and the sample does not drip in contact with flame. Time of self-extinguishing of the flame (average for 6 ignitions for 60 mil thin samples) was only 2.8 seconds, and the minimum/maximum ratios of the tests (in seconds) was one-fifth.

Numerous known additives were tried in ABS resins, and no such excellent combination of properties as with CNB (thermal stability, improved flow, very high impact strength, other excellent physical properties, and self-extinguishing nature according to the U.L. test with only 15.2 parts of the fire retardant) could be achieved with any other additive known in the art.

EXAMPLE XVII

A relatively pure sample of CNB, prepared in accordance with Example I, was rated for its flame retardant properties in a large class of polymeric materials. Unless otherwise noted, the CNB was milled into the polymeric resin to obtain a homogeneous blend. Each sample contained CNB in the amount of 16.5 percent by weight, and except for the samples which were not millable, also included 7.7% by wieght of $Sb_2O_3$, a conventional stabilizer that is synergistic to flame retardance to the halogen compounds of this invention.

It was found that CNB acts not only as a fire retardant, but also improves the hot flow of resins listed in Table II upon milling and molding at elevated temperatures. In addition, CNB and its lower-melting geometrical isomers of the same empirical formula $C_{18}H_{12}Cl_{12}$ designated as INB (see Examples XIV and XV) act as mold release agents so that the use of flammable mold release agents (such as Pluronic F-38, known in the art) is not required for ABS and ABS-type resins, when at least 1–3% of INB is employed in the resin compositions. The CNB and its isomers also diminish brittleness and improve on the flexibility of polymeric compositions.

ABS-type resins referred to hereinabove are acrylonitrile-butadiene-styrene resins which are generally prepared by first polymerizing butadiene (or substituted butadiene) to provide a rubbery substrate and thereafter polymerizing styrene (or substituted styrene) and acrylonitrile (or substituted acrylonitrile) in the presence of the prepolymerized polybutadiene substrate. An acrylate ester may also be used in addition to styrene and acrylonitrile or in place of acrylonitrile monomer. ABS graft polymers may also be prepared using other rubbery substrates, including diene copolymers and elastomers made from monomers other than dienes, such as polyisobutylene, ethylene-propylene copolymers, ethylene-vinyl acetate copolymers, acrylates, for example, polybutylacrylate and the like. Chlorinated polyethylene and olefin oxide rubbers are also elastomers that may be used as substrates in the preparation of graft polymers. ABS-type polymers are also made by milling together (or otherwise thoroughly mixing) rubbers (as defined above) with copolymers of styrene (or substituted styrene) and acrylonitrile (or substituted acrylonitrile).

The following Table II sets forth the flammability ratings for polymeric samples containing CNB:

TABLE II

| Base Material | Identification of Base Material (if applicable) | Color and Appearance After Milling[1] | Flammability Rating[2] |
|---|---|---|---|
| Polyisoprene (Natural Rubber) | Smoked sheet, Burton Rubber Company | Slightly beige-white, cohesive, sticky, very elastic | S.E. — 1 sec. |
| ABS Graft Polymer | Cycolac T, Marbon Chemical Division | Off-white, smooth surface, strong, slightly flexible, glossy, not brittle | N.F. |
| Polybutadiene, linear | Firestone HD-55-A, 35% cis- | Not millable[1], coating from xylene solution | F.R. — .3 in./min. |
| Polybutadiene, crosslinked | Marbon Chemical Division | Contains carbon black, etc.; black, smooth sheet, rubbery, very flexible | S.E. — 12 sec. |
| Butyl rubber (polyisobutylene) | 2% isoprene units- Enjay Chemical Co. | White, rubbery, porous, very flexible, high cohesive strength | F.R. — .15 in./min. |
| Polyamide (nylon) | Dupont, Zytel 211 | Not millable[1], coating from m-cresol solution | S.E. — 13 sec. |
| Polyamide (nylon, Type 8) | Dupont, Zytel 69 | Off-white, smooth, slightly flexible, very hard | S.E. — immediately |
| Poly(styrene-acrylonitrile | Marbon Chemical Division | Smooth, fairly glossy, tan-white, slightly flexible, strongly cohesive | N.F. |
| Polystyrene | Shell 300 | Hard, somewhat brittle, cohesive, smooth, slightly glossy, off-white | S.E. — 5 sec. |
| Ethylene-propylene rubber | Enjay 404 | Snow-white, porous, rubbery, flexible, cohesively very strong sheet | S.E. — 1 sec. |
| Ethylene-propylene terpolymer | Nordel 1070 | Light gray, porous, flexible, strongly cohesive, slightly rubbery | N.F. |
| Polyethylene | Marlex 1531 | Light gray, porous, flexible, strongly cohesive, slightly rubbery | N.F. |
| Poly(cyclopentadiene) | Velsicol AD- 57 | Tan golden, brittle, solid | N.F. |
| Methyl methacrylate/α-chloroacrylonitrile 80:20 copolymer | Marbon Chemical Division | Tan, hard, brittle, very hard, inflexible solid | S.E. — 2 sec. |
| Styrene/α-chloroacrylonitrile 75:25 copolymer | Marbon Chemical Division | Tan, hard, brittle sheet, slightly glossy, inflexible | S.E. — immediately |
| Styrene/α-chloroacrylonitrile/ methyl methacrylate 60:10:30 copolymer | Marbon Chemical Division | Off-white, hard, inflexible sheet, smooth and glossy | S.E. — 2 sec. |
| Vinyl toluene/butadiene 91:9 copolymer | Marbon Chemical Division | Off-white, brittle solid, hard, smooth, slightly glossy. | S.E. — immediately |
| Acrylic rubber | B.F. Goodrich | Smooth, non-porous, off-white sheet, glossy, rubbery, cohesive | S.E. — 5 sec. |
| Polycarbonate | Lexan 105 General Electric | Coating from xylene—white solid | S.E. — immediately |
| Polypropylene | Avisun, Type 1014 | Coating from xylene—white solid | S.E. — immediately |
| Styrene/butadiene | Marbon Chemical Division | Gray, hard, brittle solid, | S.E. — immediately |

TABLE II-continued

| Base Material | Identification of Base Material (if applicable) | Color and Appearance After Milling[1] | Flammability Rating[2] |
|---|---|---|---|
| 85:15 copolymer | | inflexible | |

[1] In the event the sample polymer was not millable, a coating was prepared by dissolving the polymer and the flame retardant in a suitable solvent, applying the coating to a base, and then completely evaporating the solvent.
[2] All original resins of Table II with no fire retardant additives were flammable and not self-extinguishing. Thus, the non-flammability or fire retardance achieved is directly attributed to CNB as an effective fire retardant.

EXAMPLE XVIII

The compound identified as TCNB, made in accordance with Example V, was tested as a flame retardant additive. It was mixed with certain acrylonitrile-butadiene-styrene resins at room temperature, in powdery form, and some additives were also added as follows:

| | Parts by Wt. |
|---|---|
| $C_{22}H_{24}Cl_8O_4$ or "TCNB", white crystals | 21.62 |
| Blendex 101 (an ABS resin manufactured by Marbon Chemical Division) | 50.43 |
| X-80 (an ABS resin manufactured by Marbon Chemical Division) | 18.03 |
| Thermoguard S (or $Sb_2O_3$, white powder) | 7.21 |
| Thermolite 25 (stabilizer to heat) | 0.91 |
| Pluronic F-38 (mold release) | 0.45 |
| Mekon White (additive with whitening effect) | 1.35 |
| Total ingredients of the fire retardant resin mixture | 100.00 |

This mixture was milled for 5 minutes at 330° F., and an off-white (almost white, with a slight creamy tinge), shiny, smooth, flexible resin sheet was obtained. It was tested according to ASTM D-635 test and was found to be self-extinguishing in 3.3 seconds. This fact was confirmed by a match test. The resin could be molded to self-extinguishing, pale creamy-white plaques. The remarkable and surprising advantage of using "TCNB" in the described composition for ABS resins is the combination of the easy milling and molding, the highly improved flow of the resin at elevated temperatures, with the high degree of fire retardance obtained and with good color and gloss of the plastic product. The surface of the plastic was smooth, and the product was odorless. Another advantage of TCNB (as well as of "CNB", see above, and other products of this invention) was the fact that they did not show any tendency to sublime at the conditions of milling and molding, i.e., at elevated temperatures, whereas numerous other flame retardant additives known in the art (and not related in their structure and properties to the products of this invention) did show the tendency to sublime from the hot resin, which was found to be inconvenient and sometimes hazardous for the operator. This difference is significant in favor of practical use of the products of this invention, including CNB and TCNB.

In a similar manner, TCNB or $C_{22}H_{24}Cl_8O_4$ was blended at the level of 15–22 percent by weight (with 4–7 percent by weight of antimony (III) oxide present) with other resins (listed in more detail previously from the use of CNB in various resins), including polystyrene; poly-(styrene-acrylonitrile) or polySAN; polypropylene; and Bisphenol-A polycarbonate, and in this manner self-extinguishing and flame retardant resin compositions were obtained, with improved flow of the resins and other attractive physical properties.

EXAMPLE XIX

The product referred to as BNB, made in accordance with Example VI, was tested as a flame retardant additive. A mixture, a light brown powder, was prepared at room temperature from the following ingredients.

| | Parts by Wt. |
|---|---|
| $C_{18}H_{12}Br_{12}$, a dark brown powder | 21.62 |
| Blendex 101 (an ABS resin made by Marbon Chemical Division) | 57.64 |
| X-80 (an ABS resin made by Marbon Chemical Division | 18.03 |
| Thermolite 25 | 0.91 |
| Pluronic F-38 | 0.45 |
| Mekon White | 1.35 |
| Total | 100.00 |

The mixture was milled at 330° F. for 7 minutes. A shiny, dark brown, very hard and slightly elastic sheet of flame retardant plastic was obtained. This plastic product was self-extinguishing to match flame as well as according to the ASTM D-635 test within one second. It should be specially noted that self-extinguishing properties were conferred upon the plastic even in absence of antimony (III) oxide which is a relatively expensive additive widely used to enhance the fire retardant characteristics of various halogen-containing additives to plastics. In this case, a surprisingly high degree of flame retardance was obtained without $Sb_2O_3$. The use of $C_{18}H_{12}Br_{12}$ is attractive for colored or black plastics (e.g., where usually in practice carbon black is added). For light-colored or white plastics, however, the chlorine-containing compounds of this invention are recommended.

$C_{18}H_{12}Br_{12}$ was found to have a similar flame retardant effect in polySAN, polystyrene, polypropylene, and in other plastics at comparable levels of concentration.

EXAMPLE XX

The product identified as BCN, made in accordance with Example XII, was also found to be an effective flame retardant in various resins. About 15–22 percent of the flame retardant was used in resins along with about 4–7 percent of antimony (III) oxide in order to prepare non-burning or immediately self-extinguishing samples of plastics, according to the Underwriters' Laboratories vertical test (Class I). Similar resins were fireproofed with this new compound as those described in Example XVII.

The previous examples have set forth the addition of CNB, BCN and various other additives of this invention to polymeric materials that are normally flammable or lack fire resistance. It has also been found that CNB may be used with compositions that are normally considered flame-resistant and improve the properties of these compositions as well. The principal advantage of using CNB with compositions that are normally flame-retardant such as chlorinated natural rubber is that it improves upon the flow characteristics of the polymeric material, its ease of molding and milling, tends to diminish the brittleness of the compounded resins and makes them completely non-flammable. It has also been noted that in some of the polymeric materials, there is an improvement in impact strength, flexibility and its resistance to open flame and to heat, even though the polymeric materials initially had a degree of flame-retardance. When the CNB was added to the polymeric materials set forth in Table III below, the resulting resins were non-flammable or self-extinguishing upon removal of the flame. It will be noted, for example, that the polyvinyl chloride-ABS (acrylonitrile-butadiene-styrene) composition in Table III below passed the U.L. test No. 94 of vertical flammability (was self-extinguishing immediately or within 30 seconds with no dripping of flammable material) with as little as 1–20% by weight of CNB or its analogs. These compositions are useful for automotive interior applications such as crash dash etc. The melting point of CNB is in the range of normal molding operations, i.e., below 250°C. but above 200°C. and the CNB melts and blends very well with polymeric compositions upon melting and becomes solid upon cooling. Unless otherwise indicated, CNB was milled into the polymeric resin to obtain a homogeneous blend in each of the examples set forth in the table. Each example unless otherwise indicated contained CNB in an amount of 16.5 percent by weight and the samples also included 7.7 percent by weight of $Sb_2O_3$, a conventional stabilizer and flame-retardant. In a second group of examples, 13.2 percent of CNB and 7.7 percent of $Sb_2O_3$ were used.

The characteristic properties of the polymeric materials such as brittleness, flow, flexibility, etc. are as follows.

1 — Very brittle, contains cracks.
2 — Brittle upon strong impact, hard.
3 — Hard, cohesively strong, slightly brittle.
4 — Flexible, rubbery.

The flow properties at 315°F. were as follows.
A — Not millable, poor flow.
B — Milled with difficulty.
C — Good or excellent flow properties.

The flammability rate was as follows.
BRN — Burns readily, non self-extinguishing
FR — Fire retardant, burns for specified seconds after removal of flame.
SE — Self-extinguishing, immediately or after a few seconds as specified.
SE — Self-extinguishing according to Underwriters Laboratories (U.L.) vertical fire retardance test No. 94; Group I non-dripping (no examples with CNB exceeded 20 seconds).
NSE — Non self-extinguishing.
NSE — Non self-extinguishing according to U.L. vertical test No. 94.
NF — Non-flammable, highest level of resistance to flame.

The aforementioned flame tests are taken from ASTM D-635-63.

TABLE III

| Base Material | Time Min. | Milling Temperature, °F | Flexibility and Flow of Base Material | Flexibility and Flow of the Resin Compounded with CNB (16.5%) | Flammability Rating of Compounded Resins (Both Varieties)* | Shore A Hardness of Coating Deposited from Xylene with CNB 16.5%** | Shore A Hardness of Coating Deposited from Xylene w/o CNB** |
|---|---|---|---|---|---|---|---|
| Poly-(Chloroprene) | 5 | 80° | 4–B | 4–C | NF | | |
| Poly(vinyl chloride) | 4 | 330° | 2–B | 3–C | NF | | |
| Chlorinated Natural Rubber 67% Chlorine | — | — | 1–A | 2–A | NF | 85–86 | 69–78 |
| Chlorinated Polypropylene | 20 | 80–120° Exotherm | 1–A | 2–B | NF | | |
| Chlorinated Polyethylene 40.8% Cl | 3 | 80–90° Slight Exotherm | 3–B | 4–C | NF | | |
| Chlorinated Ethylene-Propylene Rubber 28% Cl | 15 | 130°–150° | 4–B | 4–C | NF | | | l6 *ASTN D-635–63
**ASTN D 676 10 tests of each for average number.

TABLE III(a)

Properties of PVC, ABS, Plasticizers and Stabilizers With and Without CNB as an Additive

| Composition No. Ingredients, Parts by Weight: | I | II | III | IV | V | VI | VII | VII-A |
|---|---|---|---|---|---|---|---|---|
| CNB | — | — | — | 20 | 12 | 7 | 7 | 4 |
| Polyvinyl chloride | 50 | 50 | 50 | 50 | 50 | 50 | 50 | 50 |
| Blend of 60% by weight, (28% acrylonitrile-12 ½% butadiene-69 ½% styrene) graft polymer and 40% by weight (25% acrylonitrile-55% butadiene-20% styrene) terpolymer | 30 | 25 | 20 | 30 | 25 | 20 | 20 | 20 |
| Azelaic acid polyester (plasticizer) | 15 | 21 | 23 | — | 12 | 17 | 17 | 19 |

TABLE III(a)-continued

Properties of PVC, ABS, Plasticizers and Stabilizers With and Without CNB as an Additive

| Composition No.<br>Ingredients, Parts by Weight: | I | II | III | IV | V | VI | VII | VII-A |
|---|---|---|---|---|---|---|---|---|
| Epoxidized soy bean oil (plasticizer) | 5 | 7 | 7 | — | 4 | 5 | 5 | 6 |
| Tin thioglycollate (stabilizer) | 1 | 1 | — | 1 | 1 | 1 | — | — |
| Barium and cadmium stabilizer | — | — | 2 | — | — | 2 | 2 | 2 |
| Tri (nonylated phenyl phosphite) (antioxidant) | — | — | 0.5 | — | — | 0.5 | 0.5 | 0.5 |
| 80% polyoxyethylene, 20% polyoxypropylene (lubricant) | 0.5 | 0.5 | 0.5 | 0.5 | 0.5 | 0.5 | 0.5 | 0.5 |
| Zinc borate (synergistic fire retardant) ($Zn_3B_4O_9$) | — | — | — | — | — | — | — | 0.5 |
| Antimony (III) oxide (synergistic fire retardant) ($Sb_2O_3$) | — | — | — | — | — | — | 0.5 | — |
| Total Parts by Weight | 101.5 | 104.5 | 103.0 | 101.5 | 104.5 | 103.0 | 102.5 | 102.5 |
| Physical Properties: | | | | | | | | |
| Hardness, Shore A (15 sec.) | 95 | 89 | 85 | 94 | 96 | 95 | 95 | 93 |
| Hardness, Shore D (15 sec.) | 46 | 39 | — | 76 | 70 | 57 | 54 | 51 |
| Tensile Strength (psi) | 2645 | 2300 | 2500 | 4130 | 2700 | 2300 | 2300 | 2300 |
| Modulus at 100% elongation (psi) | 2365 | — | 2100 | — | 2600 | 2000 | 1950 | 1900 |
| Ultimate elongation (%) | 250 | 250 | 250 | 25 | 275 | 275 | 275 | 260 |
| Tear Strength (Die C. lbs./in.) | 425 | 306 | 260 | 821 | 689 | 430 | 435 | 430 |
| Fire Retardance: | | | | | | | | |
| U.L. vertical test No. 94 | NSE | NSE | NSE | SE in 0.5 sec. | SE in 3 sec. | SE in 13 sec. | SE in 4 sec. | SE in 16 sec. |

TABLE III(b)

Properties of PVC, ABS, Plasticizers, Stabilizers and INB (Low-Melting Isomers of CNB)

| Composition No. | VIII | IX |
|---|---|---|
| INB (low-melting isomers of CNB) | 12 | 10 |
| Polyvinyl chloride | 50 | 50 |
| Blend of 60% by weight, (28% acrylonitrile-12 ½% butadiene-69 ½% styrene) graft polymer, 40% by weight (25% acrylonitrile-55% butadiene-20% styrene) terpolymer | 25 | 20 |
| Low molecular weight polyester of azelaic acid (plasticizer) | 12 | 16 |
| Epoxidized soy bean oil (plasticizer) | 4 | 4 |
| Tin thioglycollate (stabilizer) | 1 | — |
| Barium and cadmium compound (stabilizer) | — | 2 |
| Tri-(nonylated phenyl) phosphite (antioxidant) | — | 0.5 |
| 80% of polyoxyethylene and 20% of polyoxypropylene; avg. mol. wt. 950 (lubricant) | 0.5 | 0.5 |
| Total Parts by Weight | 104.5 | 103.0 |
| Physical Properties | | |
| Hardness, Shore A (15 sec.) | 94 | 93 |
| Hardness, Shore D (15 sec.) | 65 | 60 |
| Tensile strength (psi) | 2800 | 2600 |
| Modulus at 100% elongation (psi) | 2550 | 2250 |
| Ultimate elongation (%) | 300 | 275 |
| Tear strength (Die C, lbs./in.) | 565 | 510 |
| Fire Retardance: | | |
| U.L. vertical test No. 94 | S.E. in 1.5 sec. | SE in 5.7 sec. |

The physical properties of the fire retardant compositions VIII of Table III(b) should be compared to that of composition II of Table III(a) as a control without a fire retardant additive. The properties of composition IX of Table III(b) should be compared with that of composition III of Table III(a) as a control without the fire retardant additive. This comparison will show that the desirable properties of the flexible polyvinyl chloride-(acrylonitrilebutadiene-styrene) graft polymer sheet are retained while the additional advantage of considerably increased tensile strength and tear strength is accomplished through addition of INB as set forth in Examples XIII and XIV. The latter mentioned examples containing the fire retardant additive are self-extinguishing whereas the controls II and III of Table III(a) burn longer than 30 seconds when ignited. The practical utility of the inexpensive fire retardant INB, the by-product of the higher melting CNB is immediately evident from these results.

Desirable variations of physical properties of the polyvinyl chloride-graft polymer (ABS) resins, either with or without plasticizers, can be obtained by varying the proportion of CNB or other additives, (i.e., halogenated norbornene-methanonaphthalene type) of this invention. Thus it is evident from Table III(a) that 20 parts of CNB per 101.5 parts of the total composition (composition IV) provides a high tensile strength and high tear strength polymeric blend.

The application of CNB and INB is also especially important to such thermoplastics as polyphenylene oxide (PPO) and in NORYL (polyphenylene oxide-polystyrene). In addition to achieving self-extinguishing properties, the CNB and INB serve as plasticizers for the PPO and NORYL and aid in the milling and molding of the resins. The milling can be accomplished at lower temperatures (about 400°–460°F) which is a considerable advantage since both PPO and NORYL without additives are difficult to mill and will tend to decompose and lose some of its high temperature properties when milled at its flow temperature of 500°–600°F (that temperature normally required for milling).

A composition made up of 73 parts by weight of NORYL 731-701 (General Electric resin), 7 parts by weight of antimony (III) oxide, and 20 parts by weight of either INB or CNB was found to be self-extinguishing in 0.5 to 2.4 seconds (U.L. Test No. 94).

CNB land INB are also useful in thermoplastic and thermoset materials that must be utilized as containers for edible compositions due to their essentially non-toxic characteristics. Experimental tests with rats and rabbits found the toxicity level to be extremely low (LD-50 of more than 10 g. of CNB per 1 kg. of body weight with no deaths observed. The contact was tested both on the skin and orally). The non-toxic aspects of the additives makes them exceptionally useful as fire retardants and reduces the danger to operators working with the fabrication of articles prepared from plastics containing these additives. CNB is also not an eye or skin irritant for test animals and INB indicated only slight irritation.

The CNB, INB and other halogenated norbornenemethano-naphthalene derivatives are illustrated herein as additives to given thermoplastic compositions. However, the additives may be used with a wide variety of plastic materials with properties ranging from elastomeric to hard, brittle, resinous polymers. Also the additives may be blended with halogenated resins, cured elastomers, thermosets, bituminous compositions, paints, lacquers, etc.

The addition of CNB to various thermoset resins to improve upon the fire-retardant characteristics of the resins and the results of this blending is set fourth in Table IV herein below.

Two different methods were utilized in the blending process, namely, blending (A) after crosslinking and (B) blending prior to crosslinking. In the first method, the cross-linking and grafting steps are completed first and the resins are then milled and molded with CNB to form fire-retardant compositions. In the second method, CNB is blended with the linear polymer or prepolymer and the mixture is crosslinked by heating by adding additional reactants, for example, formaldehyde or by free radical catalysts such as in the case of the unsaturated polyesters. The compositions in Table IV herein below were prepared by Method B.

TABLE IV

| Base Resin or Prepolymer | | | Other Ingredients | | Conditions of Crosslinking Reaction, after mixing (Method B) to produce thermoset Compositions. | |
|---|---|---|---|---|---|---|
| Name & Brand | Parts by Weight | CNB or $C_{16}H_{12}Cl_{12}$ | Name | Parts by Weight | Time | Temperature, °C. |
| Epoxy Resin (Shell Epon Resin 834) | 22.22 | 7.88 | Glycerol | 9.31 | 16 hrs. | 95° |
| Epoxy Resin (Shell Epon Resin 834) | 22.22 | 6.50 | Tetraethylene Pentamine | 3.79 | 12 sec. and 24 hrs. | About 100° 25° |
| Polyamide (Zytel 211) | 8.2 | 2.1 | m-Cresol (Solvent later dist'd off) and phenyl phosphonyl dichloride | 173 8.2 | 5 hrs. | 190–198° |
| Linear phenol-formaldehyde prepolymer (Durez No. 11078) | 3 | 0.75 | — | — | 1 hr. Compression molded at 50,000 psi | 183° |
| Tolylene di-isocyanate | 19.04 | 10.6 | Glycerol | 23.3 | 5 min. and (by exotherm) 10 min. | 45° 95° |
| Tolylene di-isocyanate | 38.08 | 21.4 | Tetra-ethylene pentamine ($C_8H_{23}N_5$) | 47.32 | 20 min. | 95° |
| Maleate-Isophthalate Glycol Poly-ester in 45% Styrene | 80 | 20 | Benzoyl Peroxide | 0.2 | 1 hr. 1 hr. 3 hrs. | 60° 90° 120° |
| Fumarate-isophthalate glycol polyester in 45% styrene | 80 | 20 | Tert-butyl peroxy-pivalate | 0.15 | 1 hr. 1 hr. 3 hrs. | 50° 65° 90° |
| Tolylene di-isocyanate | 31 | 15.5 | Polyol* and $CFCl_3$ | 31 | 20 min. (exotherm) | 50° |

*Pittsburgh Plate Glass Co. Polyol and Blowing Agent No. RS-6512

Using identical conditions with respect to the materials, initiators, time and temperature of heating to perform the crosslinking reactions in Table IV above, the materials were reacted in the absence of CNB or other fire-retardant additives in order to prepare the control samples. These control samples are set forth in Table V (below) in two vertical columns designated A. The self-extinguishing character of all the samples in column B, i.e., those having CNB blended therein, is set forth in Table V. Also, some advantages of the use of CNB in these compositions are set forth in Table V.

TABLE V

| General Class of the Polymer After the Crosslinking Reaction | Appearance & Color "A" (Control, Without CNB) | "B" (With CNB) | Data on Flammability "A" (Control, Without CNB) | "B" (With CNB) | Advantages of Using CNB |
|---|---|---|---|---|---|
| Crosslinked Polyether | Cloudy, silvery | White, amorphous solid | BRN | SE, 7.5 sec. | "B" is more completely reacted due to presence of CNB |
| Thermoset polyepoxy-polyamine resin | Tacky, clear yellow | Hard, smooth surface | BRN drips | SE, 1 sec. no drip | "B" is harder than A due to the presence of CNB |
| Partly crosslinked polyamide (Nylon type) | Flexible, clear, light red-brown film | Clear, red-brown solid | BRN drips | NF | Both "A" and "B" are incompletely crosslinked |
| Thermoset phenol-formaldehyde resin | Pale yellow brown, glossy solid | Pale yellow-tan, glossy solid | SE, 3 sec. | NF | Reduced brittleness and increased non-flammability for "B" (with CNB). |
| Polyurethane foam, a crosslinked resin | Soft, pale yellow-white foam | Soft, pale yellow-white foam | BRN (quickly & completely) | NF | For "B" (with CNB), non-flammable properties and no detrimental effect on physical properties |
| Polyurea, a crosslinked resin | Yellowish-white | Yellow-white solid, smooth surface | SE, 7.2 sec. black smoke | SE immediately, no smoke | Advantages for "B" include immediate self-extinguishing character and improved smoothness of surface texture. |
| Crosslinked, thermoset casting from maleate-isophthalate polyester and styrene | Pale, Yellow, glossy solid | Pale, Yellow, glossy solid | BRN | SE, 1 sec. | Non-flammability achieved in "B" without impairing Barcol hardness a.o. properties. "B" much less brittle. |
| Crosslinked thermoset casting from fumarate-isophthalate polyester and styrene | Pale, Yellow, glossy solid | Pale, Yellow, glossy solid | BRN | SE, 4.7 sec. | Non-flammability achieved in "B" without impairing physical properties. "B" much less brittle. |
| Rigid polyurethane foam, a crosslinked resin | Off-white rigid foam | White, rigid, foam | BRN (quickly and completely) | SE, 11 sec. | Fire retardance achieved in "B" without any significant change. Some improvement in color and hardness in "B". |

Tables I–III set forth blends of CNB with thermoplastic resins and illustrate the use of CNB as a fire retardant additive. It will be understood from Table IV that CNB may be blended with thermoset (crosslinked) resins as well as with normally fire retardant compositions, both in the thermoset and thermoplastic category. When blended with the thermoset resins, a thermoset fire retardant composition is obtained. Preferably, the blending is performed before the composition is crosslinked, however, CNB may be mixed with a previously crosslinked material, such as for example, crosslinked polybutadiene and utilized thereafter. When the CNB is added to self-extinguishing or slow burning resins such a the halogenated materials, the principal improvement in the halogenated compositions is their improvement is physical properties such as the improvement in flow characteristics, impact strengths and diminishing the brittleness of the resins.

Table VI herein below shows the blending of 16.5 weight percent of CNB with various rubbery materials as well as resinous materials. The fire retardant definitions are the same as those for Table III. Table VI also sets forth the curing systems.

TABLE VI

| Base Resin | Fire Retardance Control | Fire Retardance Resin Blended With CNB | Curing System Agent | Curing System Temp. °F | Time (Minutes) | Elongation Values Control (The Resin Alone with Same Curing Agents | Elongation Values Resin Blended with CNB (16.5 wt.%) & Molded with Same Curing Agents |
|---|---|---|---|---|---|---|---|
| Butyl Rubber No. 13247-E | BRN 4 in/min. | FR, 0.15 in/min. | 2% Sulfur | 320 | 20 | 563 | 683 |
| Neoprene WRT | SE, 1 sec. | NF | 5% ZnO / 4% MgO | 320 | 20 | 650 | 692 |
| Styrene-Butadiene Rubber (SBR No. 10726) | BRN | SE, immediately | 2% Sulfur | 340 | 20 | 433 | 542 |
| Ethylene-Propylene terpolymer (EPT No. 19694-CII) | BRN | NF | 1.5% Sulfur | 320 | 20 | 442 | 533 |
| Chlorinated Polyethylene (Plaskon 102, with 40.8% Cl) | SE, 2 sec. | NF | 5% ZnO / 4% MgO | 320 | 20 | 13 | 400 |
| Ethylene-propylene rubber (EPR Enjay 404) | BRN | SE, 1 sec. | 2.6% Dicumyl peroxide & 0.32% Sulfur | 320 | 30 | 450 | 1175 |

TABLE VI-continued

| Base Resin | Control | Fire Retardance Resin Blended With CNB | Agent | Curing System Temp. °F | Time (Minutes) | Elongation Values Control (The Resin Alone with Same Curing Agents) | Resin Blended with CNB (16.5 wt.%) & Molded with Same Curing Agents |
|---|---|---|---|---|---|---|---|
| Acrylic Rubber* (B.F. Goodrich No. 21465-10) | BRN | SE, 1 sec. | 5% ZnO<br>4% MgO | 340 | 30 | 180 | 225 |

*Acrylic rubber with CNB exhibited these additional improved properties: Tensile strength, 939 (Control, 890 psi); 100% modulus, 659 (control, 620); Shore A Hardness, 80 (control, 75).

As stated herein above, the norbornene-methanonaphthalene compounds are capable of being used as fire retardant additives in a variety of thermoplastic compositions. It will also be understood that superior to that of the thermoplastic compositions set forth above. Examples of the use of substituted norbornene-methanonaphthalene compounds in paints and coatings are set forth in Table VII herein below.

TABLE VII

| Control(C) or Test(T) | Pigment Formula | Pigment Parts by Weight | Binder and Fire Retardant (if any) Name | Binder and Fire Retardant (if any) Parts by Weight | Metal Weight per Weight of Binder Solvent: Turpentine Parts by Weight | Drying Agent: % Pb | Drying Agent: % Co | Appearance of Coatings or Paints | Fire Retardant Properties and Paint Surface |
|---|---|---|---|---|---|---|---|---|---|
| 1-C | TiO$_2$ | 30 | Linseed Oil | 40 | 20 | 0.4 | 0.04 | Pale tan, slightly moist, surface wrinkled | BRN* on wood, smoke, flaming drops |
| 2-T | TiO$_2$ | 30 | CNB and Linseed Oil | 15<br>25 | 20 | 0.4 | 0.04 | White, slightly moist | Self-extinguishing immediately on wood, smoke, no drip |
| 3-C | ZnO | 30 | Castor Oil | 40 | 30 | 0.4 | 0.04 | Yellow-white, moist | BNR* on cardboard, smoke, flaming drops |
| 4-T | ZnO | 30 | CNB and Castor Oil | 15<br>25 | 30 | 0.4 | 0.04 | White, slightly moist | Self-extinguishing immediately, on cardboard, smoke, no drip |
| | | | | | Solvent: VMP Naphtha, Parts by Weight | | | | |
| 5-C | Carbon Black | 30 | Linseed Oil | 40 | 30 | 0.2 | 0.02 | Black, slightly moist | Self-extinguishing in 8 sec. on wood, no drip, smoke |
| 6-T | Carbon Black | 30 | INB and Linseed Oil | 20<br>20 | 30 | 0.2 | 0.02 | Black, dry | Self-extinguishing immediately on wood, no drip, slight smoke |

*BRN — Readily burning paints and coatings.

these fire retardant thermoplastic compositions may be incorporated in paints, coatings and bituminous compositions and also that the norbornene-methanonaphthalene compounds may be incorporated in paints, coatings and bituminous compositions without utilizing the thermoplastic as a carrier.

It has been found that addition of up to 50 wt. % of CNB and/or INB to asphaltic materials such as petroleum residues, coal tar, wood tars, mineral asphalts such as gilsonite, etc., imparts a very high degree of fire retardance to such compositions. This obviously has important significance in end applications for bitumens such as roofing materials, asphaltic impregnants for walls, asphalt shingles, asphalt papers, asphaltic coatings (for plaster board, brick, wood, rope insulation mortar, cement) and the like.

These fire retardant additives may be used in paints, coatings, etc., as additives along with the inert additive fillers such as titanium dioxide, diatomaceous earth, zinc oxide, etc. The resulting coatings and paints will thus exhibit fire retardant characteristics equal to or While this invention has been described in connection with certain specific embodiments thereof, it is to be understood that this is by way of illustration and not by way of limitation; and the scope of the appended claims should be construed as broadly as the prior art will permit.

What is claimed is:

1. A flame retardant composition comprising (A) a polymeric base consisting of at least one polymer selected from the group consisting of polyisoprene, acrylinitrile-butadiene-styrene graft polymer and other ABS type resins, linear polybutadiene, crosslinked polybutandiene, polyisobutylene, polyamide, poly(styrene-acrylonitrile), polystyrene, polyvinyl chloride, ethylene-propylene rubber, ethylene-propylene terpolymer, polyethylene, poly(cyclopentadiene), acrylic rubber, polyphenylene oxide, polycarbonate, polyurethane, polypropylene and high impact polystyrene (B) a flame-retarding amount of an additive of the structure

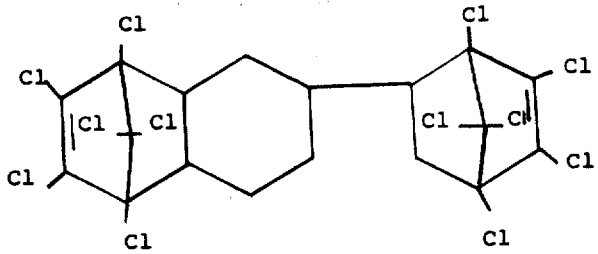

and (C) from about 5% to about 14% by weight based on the total composition of a synergistic additive selected from the group consisting of antimony, oxide, zinc borate and mixtures thereof.

2. The flame-retardant polymeric composition comprising (A) a polymeric base consisting of from about 5% to about 95% by weight polyvinylchloride and correspondingly from about 95% to about 5% by weight of an acrylonitrilebutadiene-styrene graft polymer, and (B) a flame-retarding amount of an additive of the structure

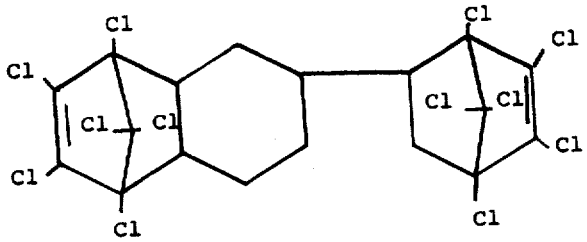

3. A flame retardant polymeric composition comprising (A) a polymeric base consisting of at least one thermoset resin selected from the group consisting of epoxy resins, phenolformaldehyde resins, thermoset polyester resins, thermoset polyurea resins and (B) a flame-retarding amount of an additive of the structure

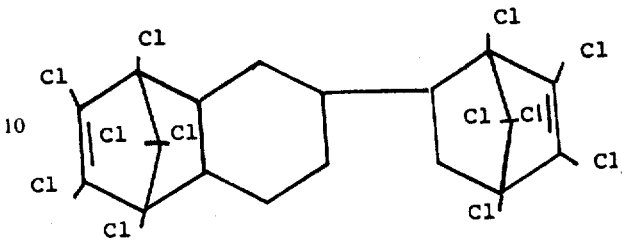

4. A flame retardant polymeric composition comprising (A) a polymeric base selected from the group consisting of chlorinated natural rubber, chlorinated polyethylene, chlorinated polypropylene, chlorinated ethylene-propylene polymer and polychloroprene and (B) a flame-retarding amount of an additive of the structure

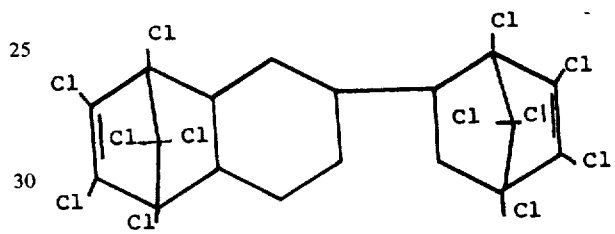

5. The flame retardant compositions of claim 1, wherein said flame retardant compound comprises from 5% to about 50% by weight of the total polymer composition.

* * * * *